(12) United States Patent
Block et al.

(10) Patent No.: US 8,228,913 B2
(45) Date of Patent: Jul. 24, 2012

(54) IMPLEMENTING SYSTEM TO SYSTEM COMMUNICATION IN A SWITCHLESS NON-IB COMPLIANT ENVIRONMENT USING INFINIBAND MULTICAST FACILITIES

(75) Inventors: Timothy Roy Block, Rochester, MN (US); Thomas Rembert Sand, Rochester, MN (US); Timothy Jerry Schimke, Stewartvile, MN (US)

(73) Assignee: International Business Machines Corporation, Armonk, NY (US)

(*) Notice: Subject to any disclaimer, the term of this patent is extended or adjusted under 35 U.S.C. 154(b) by 583 days.

(21) Appl. No.: 12/240,059

(22) Filed: Sep. 29, 2008

(65) Prior Publication Data

US 2010/0082853 A1   Apr. 1, 2010

(51) Int. Cl.
*H04L 12/28* (2006.01)
*H04L 12/56* (2006.01)
*G06F 15/173* (2006.01)
*G06F 15/16* (2006.01)

(52) U.S. Cl. ........ 370/392; 370/257; 370/258; 370/403; 709/238; 709/251; 709/253

(58) Field of Classification Search .................. 370/255, 370/389, 465; 709/225
See application file for complete search history.

(56) References Cited

U.S. PATENT DOCUMENTS

| | | | |
|---|---|---|---|
| 6,192,417 B1 * | 2/2001 | Block et al. | 709/249 |
| 6,877,044 B2 * | 4/2005 | Lo et al. | 710/2 |
| 7,245,627 B2 * | 7/2007 | Goldenberg et al. | 370/419 |
| 7,299,290 B2 * | 11/2007 | Karpoff | 709/231 |
| 7,475,174 B2 * | 1/2009 | Chow et al. | 710/74 |
| 7,484,114 B2 * | 1/2009 | Bakke et al. | 714/4.3 |
| 7,606,141 B2 * | 10/2009 | Schimke et al. | 370/216 |
| 7,610,330 B1 * | 10/2009 | Quinn et al. | 709/201 |
| 7,653,769 B2 * | 1/2010 | Fisher et al. | 710/104 |
| 7,676,558 B2 * | 3/2010 | Block et al. | 709/222 |
| 7,676,623 B2 * | 3/2010 | Fisher et al. | 710/313 |
| 7,724,748 B2 * | 5/2010 | Davis | 370/395.3 |
| 8,040,914 B2 * | 10/2011 | Green | 370/466 |
| 8,116,339 B2 * | 2/2012 | Green | 370/466 |
| 2001/0049740 A1 * | 12/2001 | Karpoff | 709/231 |
| 2002/0103943 A1 * | 8/2002 | Lo et al. | 710/2 |
| 2002/0165899 A1 * | 11/2002 | Kagan et al. | 709/104 |
| 2002/0165978 A1 * | 11/2002 | Chui | 709/238 |
| 2003/0031183 A1 * | 2/2003 | Kashyap et al. | 370/395.2 |
| 2003/0037275 A1 * | 2/2003 | Bakke et al. | 714/4 |
| 2003/0061296 A1 * | 3/2003 | Craddock et al. | 709/212 |
| 2003/0061379 A1 * | 3/2003 | Craddock et al. | 709/238 |
| 2003/0070014 A1 * | 4/2003 | Haren | 710/65 |
| 2003/0200315 A1 * | 10/2003 | Goldenberg et al. | 709/225 |
| 2003/0208531 A1 * | 11/2003 | Matters et al. | 709/203 |
| 2004/0022245 A1 * | 2/2004 | Forbes et al. | 370/392 |

(Continued)

*Primary Examiner* — Marsha D Banks Harold
*Assistant Examiner* — Christopher Wyllie
(74) *Attorney, Agent, or Firm* — Joan Pennington

(57) ABSTRACT

A method and apparatus are provided for implementing system to system communication in a switchless non-InfiniBand (IB) compliant environment. IB architected multicast facilities are used to communicate between HCAs in a loop or string topology. Multiple HCAs in the network subscribe to a predetermined multicast address. Multicast messages sent by one HCA destined to the pre-determined multicast address are received by other HCAs in the network. Intermediate TCA hardware, per IB architected multicast support, forward the multicast messages on via hardware facilities, which do not require invocation of software facilities thereby providing performance efficiencies. The messages flow until picked up by an HCA on the network. Architected higher level IB connections, such as IB supported Reliable Connections (RCs) are established using the multicast message flow, eliminating the need for an IB Subnet Manager (SM).

14 Claims, 7 Drawing Sheets

U.S. PATENT DOCUMENTS

| | | | |
|---|---|---|---|
| 2004/0213220 A1* | 10/2004 | Davis | 370/389 |
| 2004/0218623 A1* | 11/2004 | Goldenberg et al. | 370/463 |
| 2005/0144313 A1* | 6/2005 | Arndt et al. | 709/238 |
| 2005/0271073 A1* | 12/2005 | Johnsen et al. | 370/428 |
| 2006/0104265 A1* | 5/2006 | Block et al. | 370/360 |
| 2006/0203846 A1* | 9/2006 | Davis | 370/466 |
| 2008/0005329 A1* | 1/2008 | Bauman et al. | 709/226 |
| 2008/0005343 A1* | 1/2008 | Bauman et al. | 709/230 |
| 2008/0016269 A1* | 1/2008 | Chow et al. | 711/103 |
| 2008/0144531 A1* | 6/2008 | Fisher et al. | 370/255 |
| 2008/0192654 A1* | 8/2008 | Block et al. | 370/257 |
| 2009/0024817 A1* | 1/2009 | Oved | 711/170 |
| 2009/0063665 A1* | 3/2009 | Bagepalli et al. | 709/222 |
| 2010/0082853 A1* | 4/2010 | Block et al. | 710/33 |
| 2010/0095080 A1* | 4/2010 | Bauman et al. | 711/165 |
| 2010/0226375 A1* | 9/2010 | Davis | 370/395.53 |
| 2011/0268117 A1* | 11/2011 | Davis | 370/390 |

\* cited by examiner

IMPLEMENTING SYSTEM TO SYSTEM COMMUNICATION IN A SWITCHLESS NON-IB COMPLIANT ENVIRONMENT USING INFINIBAND MULTICAST FACILITIES

FIELD OF THE INVENTION

The present invention relates generally to the data processing field, and more particularly, relates to a method and apparatus for implementing system to system communication in a switchless non-InfiniBand (IB) compliant environment using InfiniBand unreliable datagram multicast facilities.

DESCRIPTION OF THE RELATED ART

Input/output (I/O) networks, such as system buses, can be used for the processor of a computer to communicate with peripherals such as network adapters or with processors of other computers in the network. However, constraints in the architectures of common I/O networks, such as the Peripheral Component Interface (PCI) bus, limit the overall performance of the I/O network and the computers and I/O peripherals that it interconnects. As a result new types of I/O networks have been introduced for interconnecting systems.

One recent type of I/O network is known and referred to as the InfiniBand (IB) network. The InfiniBand network replaces the PCI or other bus currently found in computers used for system level interconnects with a packet-switched network, complete with zero or more routers. A host channel adapter (HCA) couples the processor to a subnet, and target channel adapters (TCAs) couple the peripherals to the subnet. The subnet typically includes at least one switch, and links that connect the HCA and the TCAs to the switches. For example, a simple InfiniBand network typically has at least one switch, to which the HCA and the TCAs connect through links.

The IB fabric typically includes a plurality of endnodes, such as HCAs and TCAs, a plurality of switches, a plurality of routers, and a plurality of links. Ports on endnodes, switches, and routers are connected in a point to point fashion by links. In a known InfiniBand (IB) subnet, a Subnet Manager (SM) is responsible for initial discovery and configuration of the subnet. Another InfiniBand component known as the Subnet Administrator (SA) provided with the Subnet Manager (SM) provides services to members of the subnet including access to configuration and routing information determined by the SM. See InfiniBand Architecture Specification Volume 1 for more detail.

A need exists to establish communications over an InfiniBand (IB) fabric between Host Channel Adapters (HCAs) in distinct systems, such as processor nodes, in a network without IB switches and without a common Subnet Manager (SM) entity to assign unique local ID addresses (LIDs) to the HCA, i.e., a non-compliant IB network. The IB network may contain Target Channel Adapters (TCAs) which may or may not be IB-compliant. The network topology, being switchless, consists of multiple strings or a loop topology. Packets need to flow from source HCA to target HCA prior to LIDs being assigned with or without intermediate TCAs on the IB fabric.

Known solutions to this problem typically make use of external IB switches in a switched topology, which include a Subnet Manager function as part of the switch. The cost of the switch is a significant issue for the Small to Medium Business (SMB) environment. Also, the development, test, and maintenance costs for integrating a fully IB-compliant SM function in firmware in a processor node in a switchless environment can be significant.

A switchless solution, i.e., a string or loop topology, conventionally would require a Subnet Manager function to exist somewhere in the network, likely uniquely developed for one of the processor nodes and using the bandwidth and resources of that processor node, to manage LIDs in a multi-HCA topology. For an IB subnet, the Subnet Manager (SM) is responsible for initial discovery and configuration of the subnet. Tightly coupled with the SM is another InfiniBand component known as the Subnet Administrator (SA). The SA provides services to members of the subnet including access to configuration and routing information determined by the SM. The capabilities of the SM and SA can be sophisticated: they resolve all potential paths from all nodes with deadlock avoidance, they support many optional features of the InfiniBand Architecture (IBA), they provide quality of service (QOS) support, and the like.

Thus full SM development and deployment is a considerable software development and system expense. Additionally, the TCAs may be non-IB compliant and force solutions that are not addressed through existing IB compliant SMs.

It may be possible that other unique solutions could be developed that would require unique software intervention at each intermediate TCA to look inside incoming packet headers and determine that a special HCA only packet is on the wire and then forward out the egress port. However in addition to unique code development, this requires TCA processor cycles to partially process each inbound packet.

SUMMARY OF THE INVENTION

Principal aspects of the present invention are to provide a method and apparatus for implementing system to system communication in a switchless non-InfiniBand (IB) compliant environment using of InfiniBand unreliable datagram multicast facilities. Other important aspects of the present invention are to provide such method and apparatus for implementing system to system communication in a switchless non-InfiniBand (IB) compliant environment using of InfiniBand unreliable datagram multicast facilities substantially without negative effect and that overcome many of the disadvantages of prior art arrangements.

In brief, a method and apparatus are provided for implementing system to system communication in a switchless non-InfiniBand (IB) compliant environment. IB architected multicast facilities are used to communicate between HCAs connected, for example, in a loop or string topology. Multiple HCAs in the network subscribe to a predetermined multicast address. Multicast messages sent by one HCA destined to the pre-determined multicast address are received by other HCAs in the network. The multicast messages flow until picked up by an HCA on the network.

In accordance with features of the invention, each intermediate TCA hardware, per IB architected multicast support, forwards the multicast messages on via hardware facilities, which do not require invocation of software facilities thereby providing performance efficiencies. Each intermediate TCA forwards the multicast messages on via hardware facilities. Packets flow from source HCA to target HCA prior to LIDs being assigned with or without intermediate TCAs on the IB fabric

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method and apparatus implement system to system communication in a switchless non-InfiniBand (IB) compliant environment using InfiniBand unreliable datagram multicast facilities. The method and apparatus of the invention establish communications over an InfiniBand (IB) fabric between Host Channel Adapters (HCAs) in distinct systems (processor nodes) in a network without IB switches and without a common Subnet Manager (SM) entity to assign unique local ID addresses (LIDs) to the HCA, i.e., a non-compliant IB network. The IB network may contain Target Channel Adapters (TCAs) which may or may not be IB-compliant. The network topology, being switchless, consists of multiple strings or a loop topology. Packets are enabled to flow from source HCA to target HCA prior to LIDs being assigned with or without intermediate TCAs on the IB fabric.

It should be noted that the driving force for using non-compliant devices in an IB network are two-fold. When building an internal proprietary network topology for restricted environments, it is desirable to take advantage of high usage industry standard parts where feasible for low cost. At the same time, where the environment does not call for interconnecting with a public network but requires unique chip development for devices such as support for I/O drawers which may not be used widely in the industry, a lower cost design can be achieved by defining less complex non-compliant devices such as switches and bridge logic for the referenced I/O drawers. Secondly, this environment can also achieve significant savings with respect to software development and support by greatly simplifying and reducing the role of such IB compliant entities as a Subnet Manager for network control.

Figure 1:
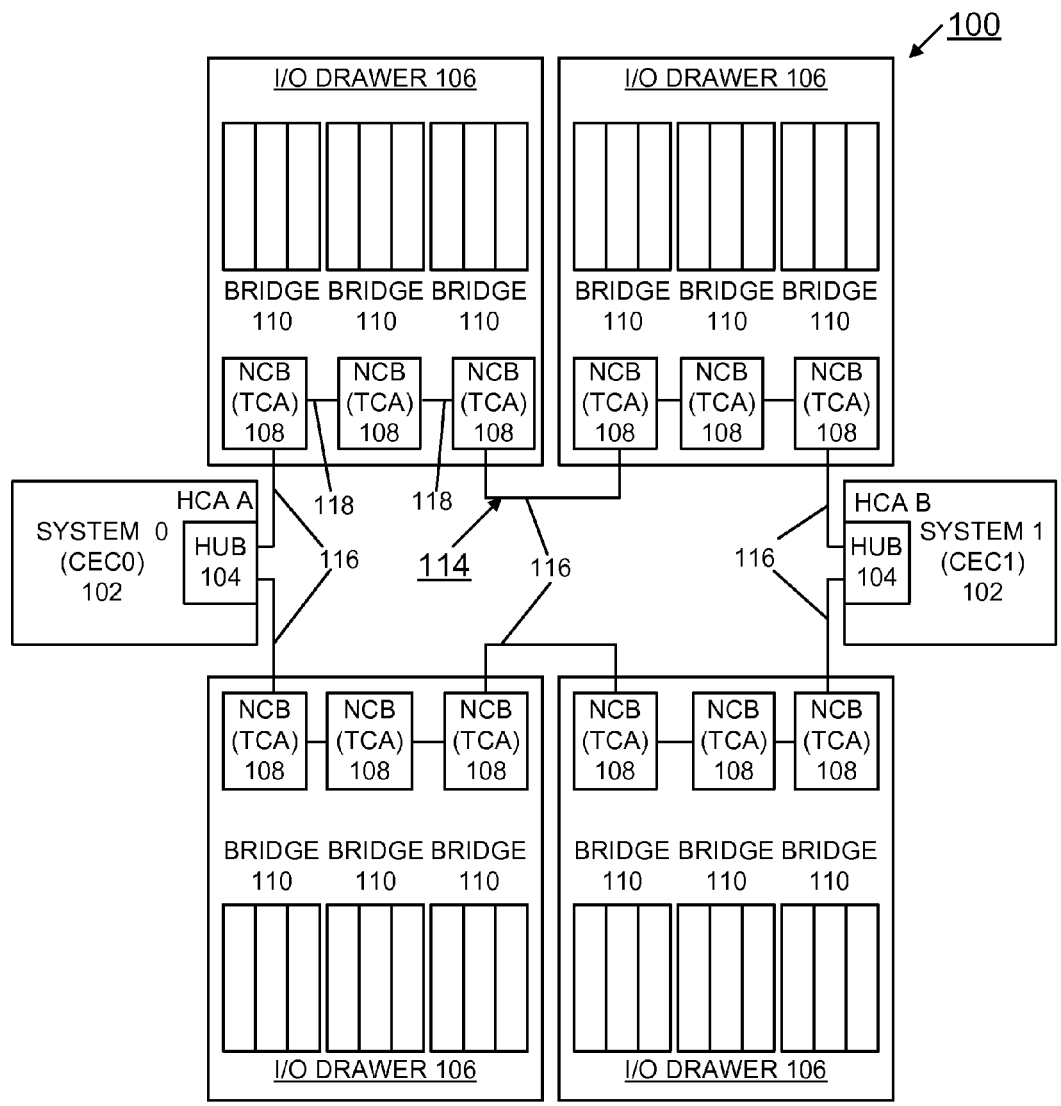
FIG. 1 illustrates an example loop topology of a non-compliant InfiniBand (IB) network for implementing system to system communication in a switchless non-IB compliant environment using InfiniBand unreliable datagram multicast facilities in accordance with the preferred embodiment.

Having reference now to the drawings, in FIG. 1, there is shown a non-compliant InfiniBand (IB) network generally designated by the reference character 100 for implementing system to system communication without an IB switch in the non-IB compliant environment using InfiniBand unreliable datagram multicast facilities in accordance with the preferred embodiment in accordance with the preferred embodiment. The non-compliant InfiniBand (IB) network 100 is provided without IB switches and without a common Subnet Manager (SM) entity conventionally used to assign unique local ID addresses (LIDs) to the HCA, i.e., network 100 is a non-compliant IB network.

The illustrated non-compliant InfiniBand (IB) network 100 provides an example loop topology, while it should be understood that the present invention can be implemented with an IB network that includes multiple strings or the loop topology.

The non-compliant InfiniBand (IB) network 100 includes a first system 0 or Component Enclosure Complex (CEC) CEC0, 102 and a second system 1 or CEC1, 102, each including a Hub 104. The Hub hardware 104 along with the firmware used to control the Hub hardware is illustrated and described with respect to FIG. 2.

The non-compliant InfiniBand (IB) network 100 includes a plurality of input/output (I/O) enclosures or I/O drawers 106, each including at least one bridge chip. As shown, each of the I/O drawers 106 includes a plurality of non-IB compliant IB to PCI bridge chips (NCBs) or target channel adapters (TCA) 108 with an associated PCI Host bridge 110 including one or more slots.

An InfiniBand (IB) fabric generally designated by the reference character 114 provides the example loop topology including a plurality of IB links 116, 118. The IB links 116 or IB cables 116 are point-to-point links connecting respective IB ports of the CEC0 or HCA A, 102 and CEC1 or HCA B, 102 to respective IB ports of adjacent I/O drawers 106. The IB links 118 are point-to-point links connecting respective adjacent NCB or TCAs 108.

Figure 2:
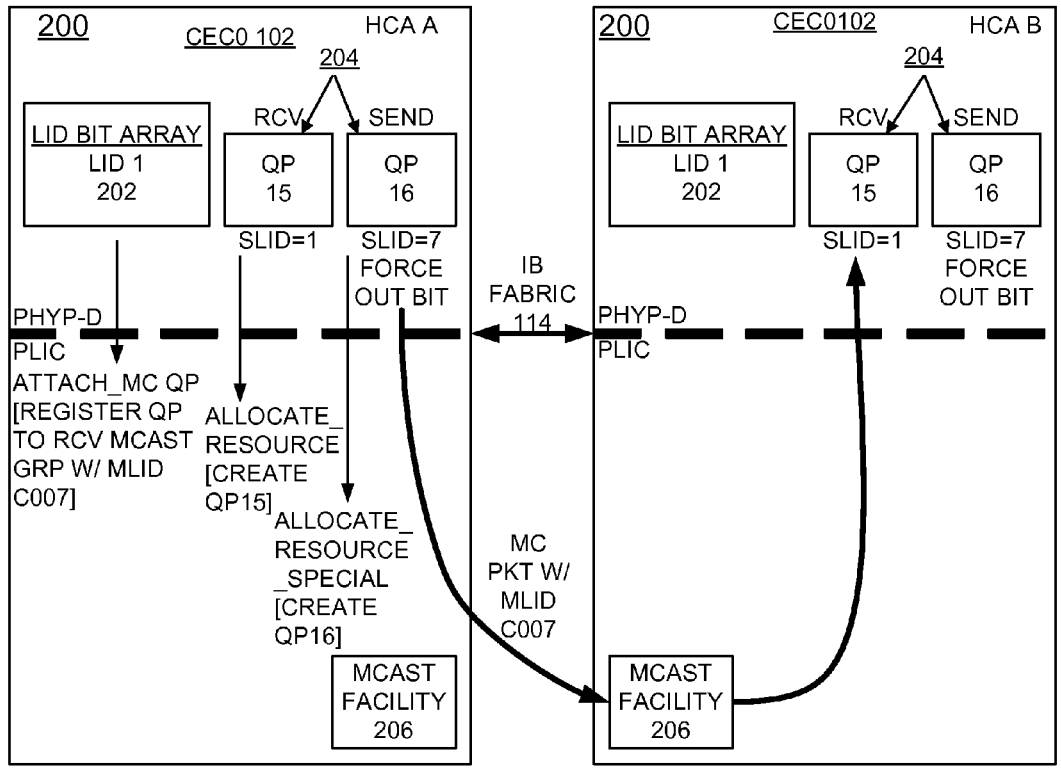
FIG. 2 illustrates Hub firmware of each respective system or Component Enclosure Complex (CEC) of FIG. 1 for implementing system to system communication in accordance with the preferred embodiment.

Referring to FIG. 2, there is shown Hub controlling firmware generally designated by the reference character 200 contained with Hub 104 of each of the CEC0 or HCA A, 102 and CEC1 or HCA B, 102. Hub firmware 200 includes a local ID addresses (LID) Bit Array containing an entry LID, for example LID 1, 202, a send and a receive queue pair (QP) 204, and an IB architected multicast facility 206 to communicate between HCAs in a loop or string topology in accordance with the preferred embodiment. LID 1, 202, and the send and receive queue pair (QP) 204 are provided with an upper Hub controlling firmware layer labeled PHYP-D for a dispatchable power hypervisor environment. The IB architected multicast facility 206 is shown at a lower Hub controlling firmware hypervisor layer labeled PLIC for Power License Internal Code.

As shown in FIG. 2, at a sending HCA A or CEC0, 102 a multicast queue pair MC QP is allocated with appropriate attributes to send multicast packets to a predefined LID or multicast address C007, for example. The send and receive queue pair (QP) 204 are allocated to be used with associated required Completion Queues (CQs) and Event Queues (EQs) and event notification handlers, illustrated and described with respect to FIG. 4. The local HCA hardware is also set via a Force Out Bit in an HCA control register so that messages sent with associated Work Queue Entries with the Force Out Bit set will bypass internal routing checks and will be forced out on the wire without being delivered internally to the other HCA ports locally.

As shown in FIG. 2, receive QP15 is allocated with a source LID of 1 and is attached to a multicast group registered to receive multicast messages addressed to pre-determined multicast address C007. A multicast packet MC PKT with MLID C007 is sent from sending HCA A or CEC0, 102 to the receiving HCA B or CEC1, 102 as shown at blocks 210 and 212 in FIG. 2.

The LID Bit Array 202 shown in FIG. 2 is a software structure that is consulted when receiving incoming packets. Packets destined for LID1 are checked against the corresponding entry in the LID Bit Array. If LID1 is enabled in the array 202, the packet is received and will not be forwarded on from this HCA or the receiving HCA B as shown in FIG. 2 as shown at blocks 212 and 214 in FIG. 2. This prevents circulating of multicast messages in the network and simulates, if you will, a point to point HCA message flow utilizing existing IB architected multicast facilities.

It should be noted that alternative embodiments of this invention can be implemented with a single QP on each CEC serving as both send and receive QP functions. Also, the specific HCA design will dictate whether special features such as the Force Out Bit described above are required to force routing out the HCA ports versus routing internal to the HCA. It is only critical to the invention that the multicast messages are routed externally out an HCA port and not routed internally as if delivery is only required local to the HCA.

Figure 3:
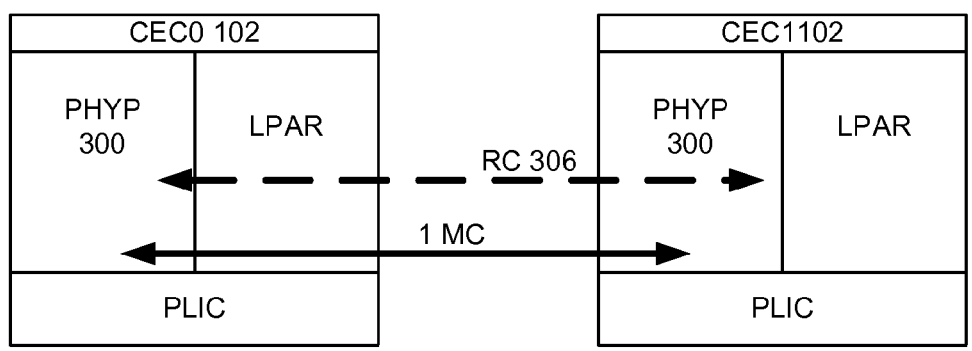
FIG. 3 illustrates higher level IB connections established once LIDs are assigned in the loop topology IB network of FIG. 1 for implementing system to system communication in accordance with the preferred embodiment.

Referring also to FIG. 3, higher level IB connections are established once LIDs are assigned in the loop topology IB network 100 by the Hub firmware 200. First the multicast MC messages flow is provided between upper IB layers between power hypervisor PHYP 300 of CEC0 and CEC1 as indicated by solid connection line MC 304, as further illustrated and described with respect to FIG. 4. The power hypervisor PHYP 300 of CEC0 and CEC1 is shown with an upper logical partition labeled LPAR above Hub controlling firmware hypervisor layer PLIC. No LIDs have as yet been assigned to the HCA ports so LID-Routed messages would not be able to flow but the multicast messages MC proceed through each TCA 108 and are forwarded on by the TCA hardware with no TCA software or local I/O processor intervention required, and will reach and be processed by the first HCA in the loop 114 to receive the multicast message. The Hub firmware 200 including the multicast facility 206 is used as a bootstrap communications mechanism to build up to architected IB connections such as IB supported Reliable Connections (RCs). Once LIDs are assigned, higher level IB connections are established as shown at block 214 in FIG. 2, or a reliable connection RC as indicated by dotted connection line RC 306 between CEC0 to CEC1 for using standard Internet protocol (IP) over the non-compliant IB fabric 114.

Figure 4:
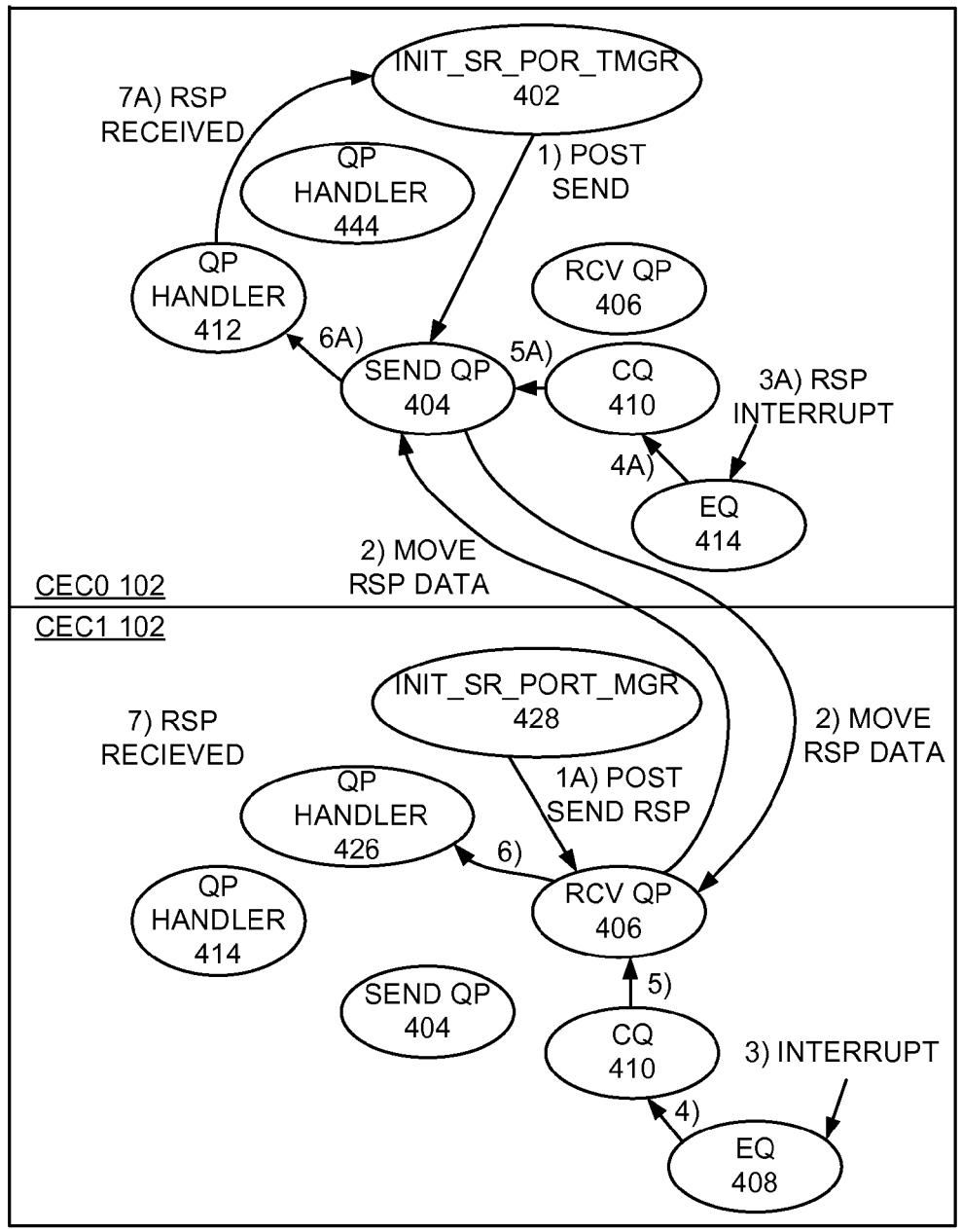
FIG. 4 illustrates a multicast message flow from one Component Enclosure Complex (CEC) to another Component Enclosure Complex (CEC) of FIG. 1 for implementing system to system communication in accordance with the preferred embodiment.

Referring also to FIG. 4, illustrates a multicast message flow from sending HCA A or CEC0, 102 to the receiving HCA B or CEC1, 102 in accordance with the preferred embodiment. An initial send and receive port manager INIT SR PORT MGR 402 posts a message as indicated at line 1) POST SENT to a send queue pair SEND QP 404. As indicated at line 2) MOVE DATA, the Hub hardware moves data from the send queue pair SEND QP 404 to a receive queue pair RCV QP 406 of the receiving HCA B or CEC1, 102. An interrupt is generated as indicated at line 3) INTERRUPT applied to an event queue EQ 408 and as indicated at line 4) applied to a completion queue CQ 410 and coupled to the receive queue pair RCV QP 406 as indicated at line 5). As indicated at line 6) the receive queue pair RCV QP 406 is coupled to a queue pair QP handler 412, which applied the received message to the initial send and receive port manager INIT SR PORT MGR 402 of the receiving HCA B or CEC1, 102 as indicated at line 7) RECV MSG.

At the receiving HCA B or CEC1, 102, the initial send and receive port manager INIT SR PORT MGR 402 posts a response message as indicated at line 1A) POST SENT RSP to the receive queue pair RCVD QP 406. As indicated at line 2A) MOVE RSP DATA, the Hub hardware moves the response data from the receive queue pair RCVD QP 406 to the send queue pair SEND QP 404 of the HCA A or CEC0, 102. An response interrupt is generated as indicated at line 3A) RSP INTERRUPT applied to the event queue EQ 408 of the HCA A or CEC0, 102 and as indicated at line 4A) applied to the completion queue CQ 410 and coupled to the send queue pair SEND QP 404 as indicated at line 5A). As indicated at line 6A) the send queue pair SEND QP 404 is coupled to the queue pair QP handler 412, which applies the received response message to the initial send and receive port manager INIT SR PORT MGR 402 of the HCA A or CEC0, 102 as indicated at line 7A) RES RECEIVED.

While generating an interrupt and response interrupt is illustrated in FIG. 4, it should be understood that the present invention can be implemented with an alternative method. For example, polling for Completion Queue (CQ) and Event Queue (EQ) could be used.

Figure 5:
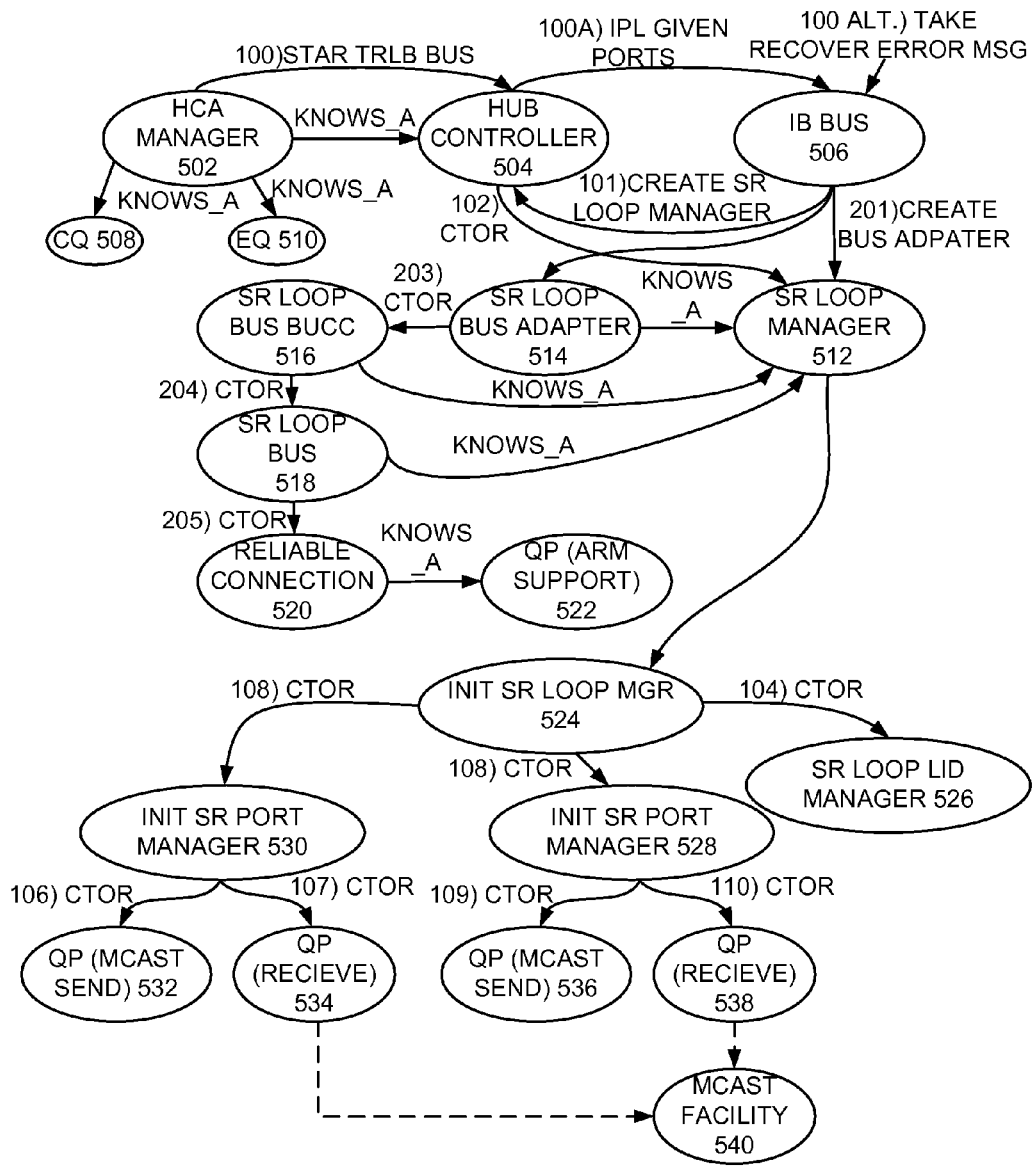
FIG. 5 is a higher level object relational diagram illustrating firmware and structure objects for managing special queue pairs (QPs) for implementing system to system communication in accordance with the preferred embodiment.

Referring now to FIG. 5, there is shown a higher level object relational diagram illustrating HCA firmware and structure objects for managing special queue pairs (QPs) generally designated by the reference character 500 for implementing system to system communication in accordance with the preferred embodiment. HCA controlling firmware and structure objects 500 include respective lines connected to firmware and structure objects that are provided in a 100 series and a 200 series, respectively indicating first and second series of steps or operations within the initialization process.

HCA controlling firmware and structure objects 500 include an HCA manager 502 coupling information and controls to a HUB controller 504, an Event Queue (EQ) 506, and a Completion Queue (CQ) 508 as indicated at respective lines labeled 100) START IB BUS, and KNOWS_A, where KNOWS_A indicates a pointer to a resource or other object in a separate memory location. HCA firmware and structure objects 500 include a IB Bus 510 started by the HUB controller 504 as indicated at respective lines 100A) IPL GIVEN PORTS; and 101) CREATE SR LOOP MANAGER. Alternatively, as indicated at a line 100ALT.) TAKE RECOVERABLE ERROR MSG is applied to the IB Bus 510.

The IB Bus 510 and HUB controller 504 are coupled to a lower level manager or SR Loop Manager 512, as indicated at respective lines 102) CTOR (C++ constructor in this implementation), and 201) CREATE BUS ADAPTER. The IB Bus 510 and HUB controller 504 is coupled to a lower level bus adapter or a SR Loop Bus Adapter 514, as indicated at line 202) CTOR, which is coupled to a SR Loop Bus Bucc 516 as indicated at line 203) CTOR. The SR Loop Bus Bucc 516 is coupled to a SR Loop Bus 518 as indicated at line 204) CTOR. The SR Loop Bus 518 is coupled to a Reliable Connection 520 as indicated at line 205) CTOR, which is coupled to a queue pair QP (APM support) 522 as indicated at line KNOWS_A.

The SR Loop Manager 512 is coupled to lower level manager or an initial SR Loop Manager 524, as indicated at line 103) CTOR, which is coupled to a SR Loop LID Manager 526 as indicated at line 104) CTOR and is coupled to a SR Port Manager 528 as indicated at line 105) CTOR. The SR Port Manager 528 is coupled to a queue pair QP (Mcast Send) 530 as indicated at line 106) CTOR and to a queue pair QP (Receive) 532 as indicated at line 107) CTOR. The initial SR Loop Manager 524, is coupled to a initial SR Port Manager 534 as indicated at line 108) CTOR, which is coupled to a queue pair QP (Mcast Send) 536 as indicated at line 109) CTOR and to a queue pair QP (Receive) 538 as indicated at line 110) CTOR. The queue pair QP (Mcast Send) 530, and queue pair QP (Mcast Send) 536 is a separate QP class for multicast messages. A multicast facility 540 is connected to each of the QP (Receive) 532, and the QP (Receive) 538. The multicast facility 540 under the QP objects 530, 532, 536 538

Figure 6:
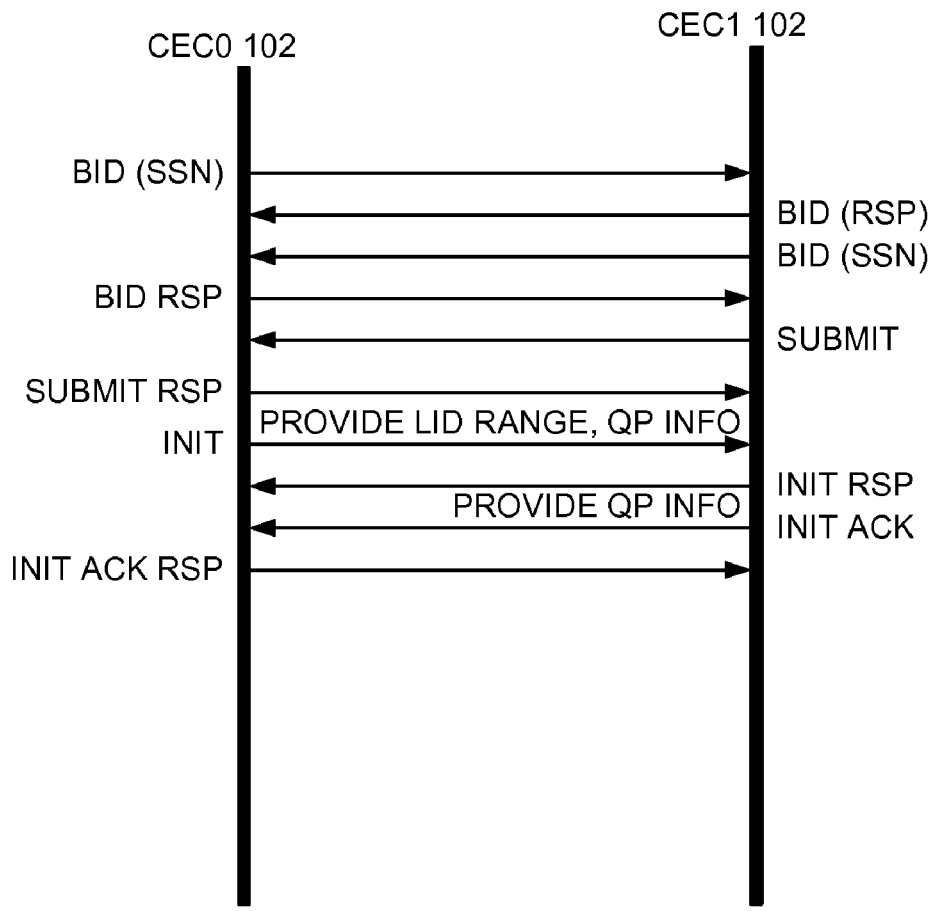
FIG. 6 illustrates a protocol flow to establish a master/slave relationship between Component Enclosure Complexs (CECs) to provide local ID addresses (LID) definition without LID space contention for implementing system to system communication in accordance with the preferred embodiment.

Referring now to FIG. 6, there is shown a protocol flow to establish a master/slave relationship between Component Enclosure Complexes (CECs) to provide local ID addresses (LID) definition without LID space contention for implementing system to system communication in accordance with the preferred embodiment. An initial message flow over the multicast MC 304 of FIG. 3 includes a first system, such as CEC0, 102 sending a multicast request or BID TO CEC1, 102 including a system serial number (SSN), and a BID response and a BID including a system serial number (SSN) sent by CEC1, 102 to CEC0, 102. A scheme such as the higher serial number CEC takes on the role of the master with the lower serial number CEC "submitting" to the master i.e., taking on a slave role in exchange protocols. Then submit and submit response messages are exchanged by CEC0, 102 and CEC1, 102, which are followed by Initialization and Initialization response messages providing LID range and QP information being exchanged by CEC0, 102 and CEC1, 102. Initialization acknowledge and Initialization acknowledge response messages complete the initial message flow over the multicast MC 304 of FIG. 3. At this point in the protocol, necessary and sufficient data has been exchanged between the two CECs allowing for the creation of reliable connections RC for further messaging as indicated by dotted connection line RC 306 between CEC0 to CEC1 of FIG. 3.

Figure 7:
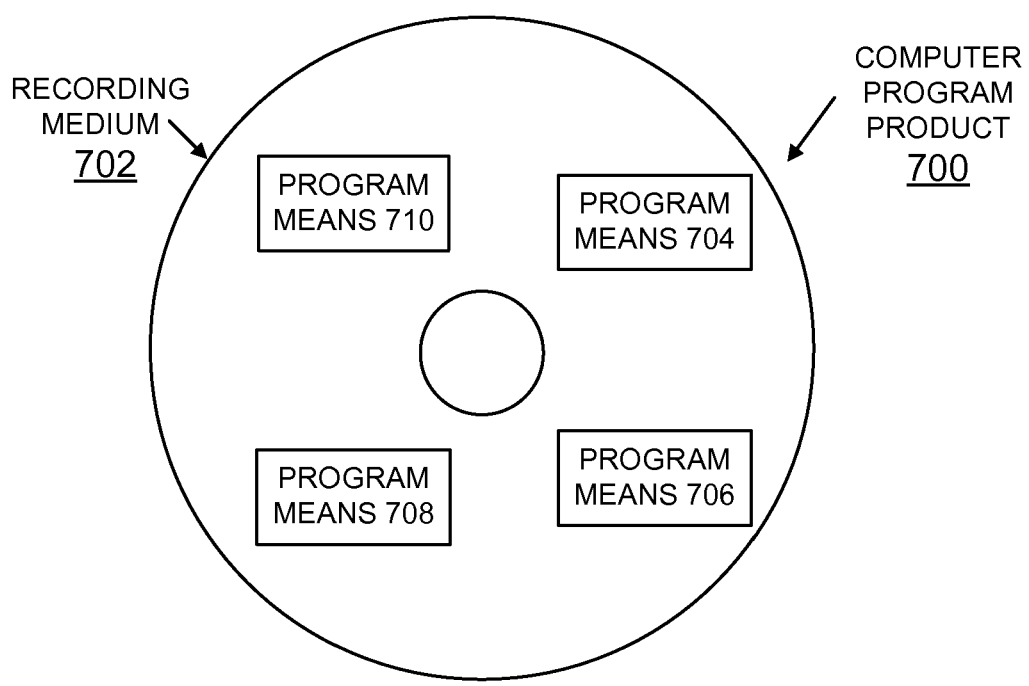
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, or another similar computer program product. Recording medium 702 stores program means 704, 706, 708, 710 on the medium 702 for carrying out the methods for establishing communications over the non-compliant InfiniBand (IB) network 100 of the preferred embodiment of FIG. 1.

A sequence of program instructions or a logical assembly of one or more interrelated modules defined by the recorded program means 704, 706, 708, 710, direct the systems or CEC0, CEC1, 102 for establishing communications over a non-compliant InfiniBand (IB) network of the preferred embodiment.

While the present invention has been described with reference to the details of the embodiments of the invention shown in the drawing, these details are not intended to limit the scope of the invention as claimed in the appended claims.

What is claimed is:

1. A method for implementing system to system communication in a switchless non-InfiniBand (IB) compliant environment, an InfiniBand (IB) fabric including a plurality of IB links, each system including a Host Channel Adapters (HCA) connected to respective IB links of the an InfiniBand (IB) fabric, and each HCA including IB multicast facilities, said method comprising:

providing a predetermined multicast address used by the HCAs for communicating between HCAs ;

a first HCA sending multicast messages destined to the predetermined multicast address on respective IB links of the IB fabric prior to local ID addresses (LIDs) being assigned in the non-InfiniBand (IB) compliant environment without IB switches and without a common Subnet Manager (SM) entity;

providing a flow of the multicast messages on the IB fabric until an HCA on the IB fabric picks up the multicast messages;

a second HCA receiving incoming packets on at least one respective IB link of the IB fabric, identifying the predetermined multicast address, and receiving the multicast messages without forwarding the multicast messages; and responsive to the first HCA sending multicast messages destined to the predetermined multicast address, the second HCA sending multicast response messages, establishing higher level IB connections.

2. The method for implementing system to system communication in a switchless non-InfiniBand (IB) compliant environment as recited in claim 1 wherein the first HCA sending multicast messages destined to the predetermined multicast address includes the first HCA sending a multicast bid including a system serial number (SSN) of the first HCA.

3. The method for implementing system to system communication in a switchless non-InfiniBand (IB) compliant environment as recited in claim 2 wherein the first HCA sending multicast messages destined to the predetermined multicast address includes the second HCA sending a multicast bid response including a system serial number (SSN) of the second HCA.

4. The method for implementing system to system communication in a switchless non-InfiniBand (IB) compliant environment as recited in claim 1 wherein the first HCA sending multicast messages destined to the predetermined multicast address includes the first HCA allocating a send and a receive queue pair (QP) with a source local ID address (LID).

5. The method for implementing system to system communication in a switchless non-InfiniBand (IB) compliant environment as recited in claim 4 includes the first HCA sending a multicast message including LID and QP information.

6. The method for implementing system to system communication in a switchless non-InfiniBand (IB) compliant environment as recited in claim 5 includes the second HCA sending a multicast response message including QP information.

7. The method for implementing system to system communication in a switchless non-InfiniBand (IB) compliant environment as recited in claim 1 wherein establishing higher level IB connections includes establishing IB supported Reliable Connections (RCs) between the first HCA and the second HCA.

8. A method for implementing system to system communication in a switchless non-InfiniBand (IB) compliant environment, an InfiniBand (IB) fabric including a plurality of IB links, each system including a Host Channel Adapters (HCA) connected to respective IB links of the InfiniBand (IB) fabric, and each HCA including IB multicast facilities, said method comprising:

providing a predetermined multicast address used by the HCAs for communicating between HCAs;

a first HCA sending multicast messages destined to the predetermined multicast address on respective IB links of the IB fabric prior to local ID addresses (LIDs) being assigned in the non-InfiniBand (IB) compliant environment without IB switches and without a common Subnet Manager (SM) entity;

providing a flow of the multicast messages on the IB fabric until an HCA on the IB fabric picks up the multicast messages;

a second HCA receiving incoming packets on at least one respective IB link of the IB fabric, identifying the predetermined multicast address, and receiving the multicast messages without forwarding the multicast messages;

responsive to the first HCA sending multicast messages destined to the predetermined multicast address, the second HCA sending multicast response messages, establishing higher level IB connections; and a plurality of intermediate Target Channel Adapters (TCAs) connected to respective IB links of the InfiniBand (IB) fabric between the first HCA and the second HCA, and each of the plurality of intermediate TCAs forwarding the multicast messages on via hardware facilities without invocation of software facilities or local I/O processor cycles.

9. A non-transitory computer program product implementing system to system communication in a switchless non-InfiniBand (IB) compliant environment, an InfiniBand (IB) fabric including a plurality of IB links, each system including a Host Channel Adapters (HCA) connected to respective IB links of the a-a InfiniBand (IB) fabric, and each HCA including IB multicast facilities, said non-transitory computer program product including a plurality of computer executable instructions stored on a non-transitory computer readable medium, wherein said instructions, when executed by a HCA, cause the HCA to perform the steps of:

providing a predetermined multicast address used by the HCAs for communicating between HCAs;

sending, by a first HCA, multicast messages destined to the predetermined multicast address on respective IB links of the IB fabric prior to local ID addresses (LIDs) being assigned in the non-InfiniBand (IB) compliant environment without IB switches and without a common Subnet Manager (SM) entity;

providing a flow of the multicast messages on the IB fabric until an HCA on the IB fabric picks up the multicast messages;

receiving, by a first HCA, incoming packets on at least one respective IB link of the IB fabric, identifying the predetermined multicast address, and receiving the multicast messages without forwarding the multicast messages; and responsive to the first HCA sending multicast messages destined to the predetermined multicast address, the second HCA sending multicast response messages, establishing higher level IB connections.

10. The non-transitory computer program product implementing system to system communication as recited in claim 9 wherein the first HCA sending multicast messages destined to the predetermined multicast address includes the first HCA allocating a send and a receive queue pair (QP) with a source local ID address (LID); and sending a multicast message including LID and QP information.

11. The non-transitory computer program product implementing system to system communication as recited in claim 10 further includes the second HCA sending a multicast response message including QP information.

12. The non-transitory computer program product implementing system to system communication as recited in claim 9 wherein establishing higher level IB connections includes establishing IB supported Reliable Connections (RCs) between the first HCA and the second HCA.

13. An apparatus for implementing system to system communication in a switchless non-InfiniBand (IB) compliant environment comprising:

an InfiniBand (IB) fabric including a plurality of IB links;
each system including a Host Channel Adapters (HCA) connected to respective IB links of the InfiniBand (IB) fabric,
a predetermined multicast address used by each of the HCAs;
each HCA including IB multicast facilities for sending multicast messages on the respective IB links of the IB fabric;
a first HCA sending multicast messages destined to the predetermined multicast address on respective IB links of the IB fabric prior to local ID addresses (LIDs) being assigned in the non-InfiniBand (IB) compliant environment without IB switches and without a common Subnet Manager (SM) entity;
a second HCA receiving incoming packets, identifying the predetermined multicast address, and receiving the multicast messages without forwarding the multicast messages;
responsive to the first HCA sending multicast messages destined to the predetermined multicast address, the second HCA sending multicast response messages, establishing higher level IB connections; and
a plurality of intermediate Target Channel Adapters (TCAs) connected to respective IB links of the InfiniBand (IB) fabric between the first HCA and the second HCA, and wherein each of the plurality of intermediate TCAs forwards the multicast messages on via hardware facilities without invocation of software facilities.

14. The apparatus for implementing system to system communication in a switchless non-InfiniBand (IB) compliant environment as recited in claim 13 wherein the first HCA and the second HCA establishing higher level IB connections includes the first HCA and the second HCA establishing IB supported Reliable Connections (RCs) between the first HCA and the second HCA.

* * * * *